Nov. 21, 1933.   W. A. LIERMAN ET AL   1,936,135
COTTON CHOPPER
Original Filed Aug. 4, 1931   2 Sheets-Sheet 2
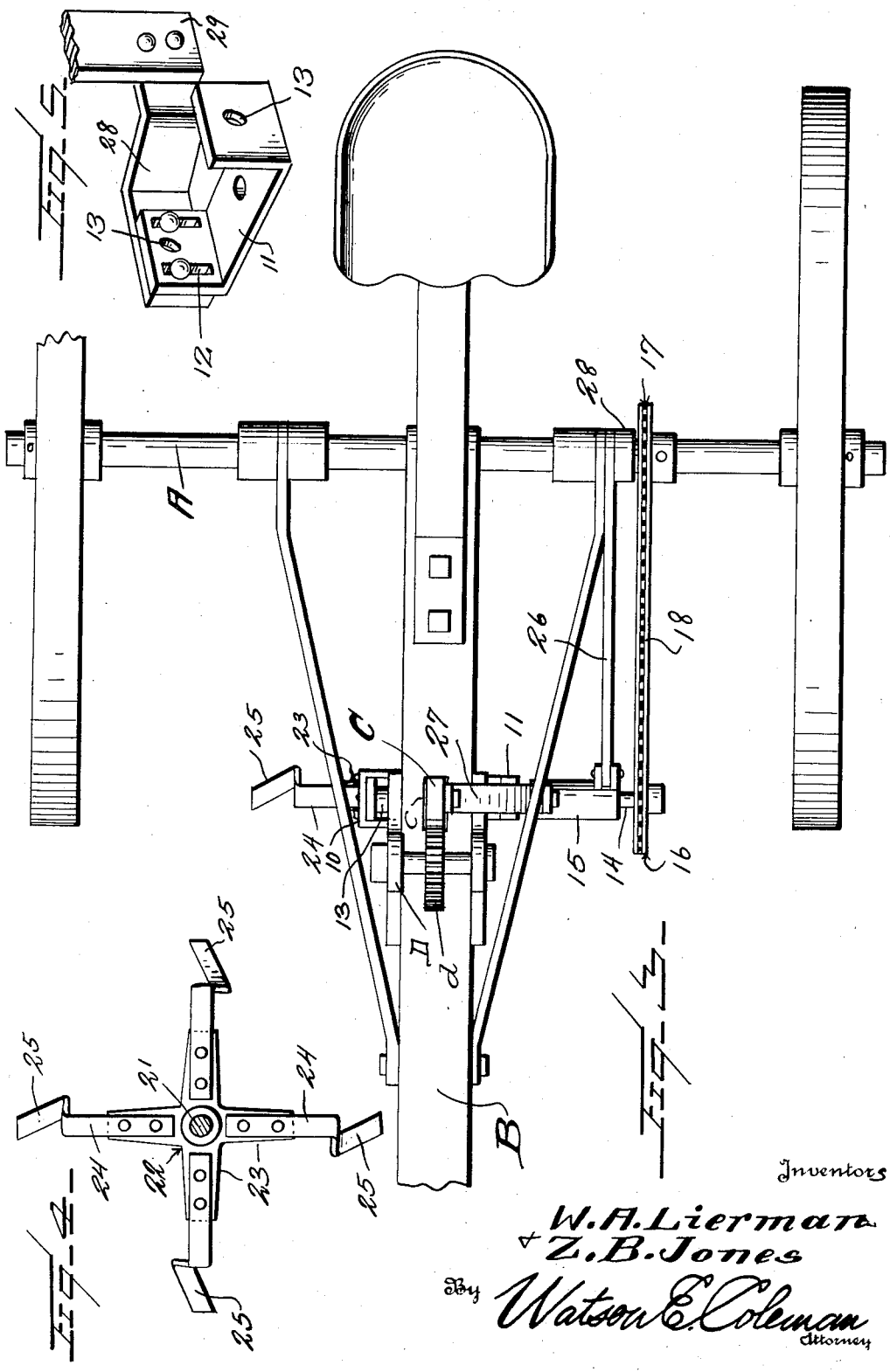

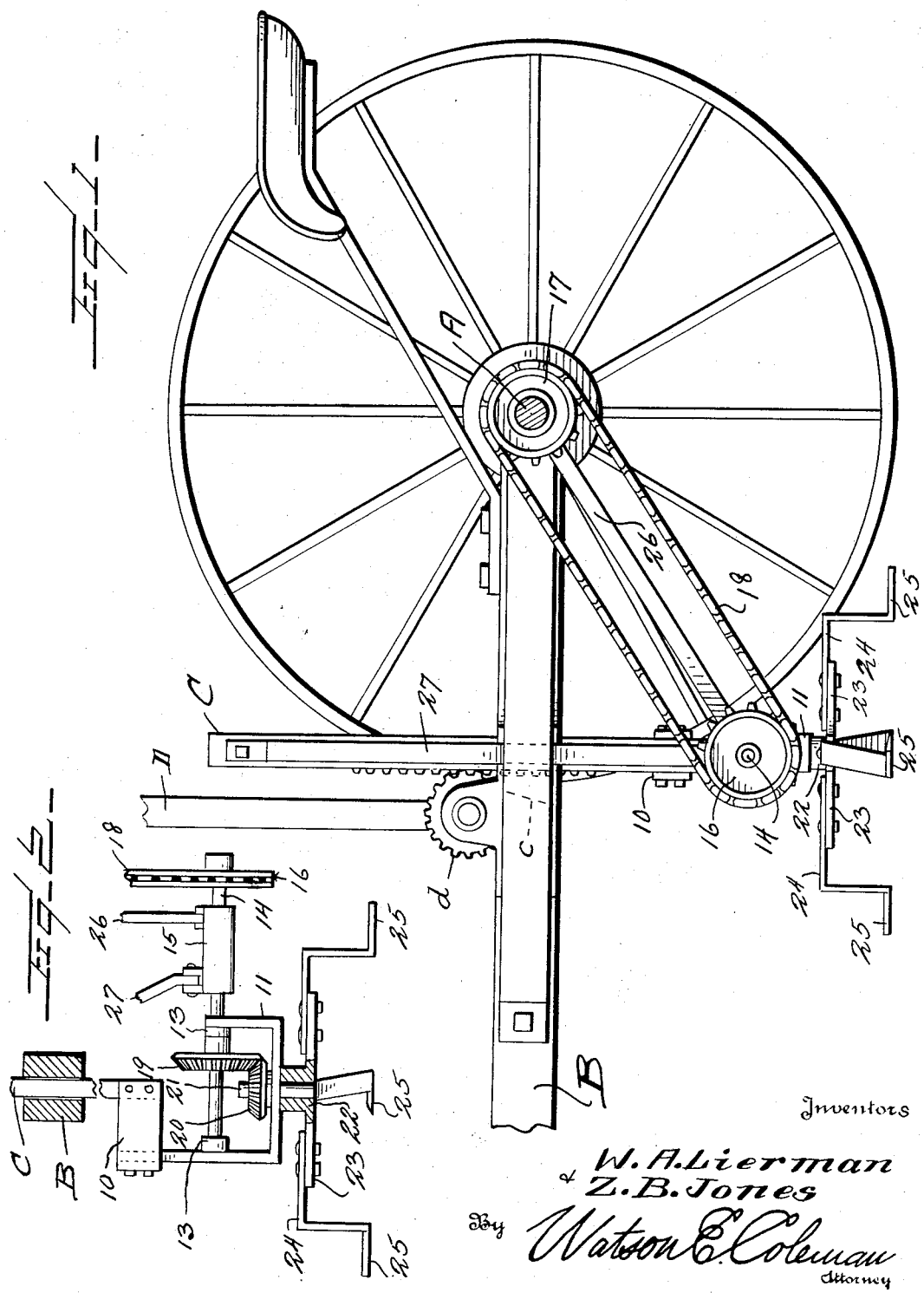

Patented Nov. 21, 1933

1,936,135

UNITED STATES PATENT OFFICE 1,936,135

COTTON CHOPPER

William A. Lierman and Zilmon B. Jones, Kenedy, Tex.

Refiled for abandoned application Serial No. 555,086, August 4, 1931. This application June 27, 1933. Serial No. 677,928

4 Claims. (Cl. 97—17)

This invention relates to cotton choppers and particularly to that variety of cotton chopper in which the hoes or cutters are arranged to rotate around a common center and to thus sweep or bar off the plants and chop them to a proper stand.

The general object of our invention is to provide a very simple mechanism of this character which is adapted to be mounted upon a planter and operated thereby and which is driven from the traction wheels of the planter.

Other objects will appear in the course of the following description.

Our invention is illustrated in the accompanying drawings, wherein

Fig. 1 is a side elevation of a cotton chopper constructed in accordance with our invention.

Fig. 2 is a fragmentary front elevation partly broken away of the attachment itself.

Fig. 3 is a top plan view of the planter and cotton chopping attachment applied thereto.

Fig. 4 is a top plan view of the spider and chopper, the shaft being shown in section.

Fig. 5 is a perspective detailed view of a slightly modified form of the means for supporting the chopper.

Referring to these drawings, it will be seen that we have illustrated the frame of an ordinary planter leaving off the planter mechanism as having no part in our invention. The frame includes the axle A, the tongue B and an upright lifting beam C. Mounted upon the lower end of the upright lifting beam C is a laterally projecting bracket 10. Mounted upon this bracket is a housing or frame 11 having slots 12 through which bolts may be passed to engage the bracket so as to permit this housing or frame to be adjusted. The housing or frame 11 carries bearings 13 for a transversely extending shaft 14. This shaft passes through a bearing sleeve or collar 15 and carries at its end the sprocket wheel 16. A driving sprocket wheel 17 is mounted upon the axle A and a sprocket chain 18 passes over these sprocket wheels to provide a driving connection between the shaft A and the shaft 14. Mounted upon the shaft 14 is a beveled gear wheel 19 which engages a beveled gear wheel 20 mounted on a vertically disposed shaft 21 which extends down through a bearing formed in the housing 11. This shaft carries upon its lower end a spider 22 having a plurality of radiating arms 23 to which the hoes or choppers 24 are attached. These choppers have shanks which are bolted to the arms 23 of the spider, the shanks then extending downward and being provided with the outwardly horizontally disposed radial chopping blades 25 which cut just below the surface of the ground or at the surface, depending upon the adjustment of the mechanism.

The bearing 15 is supported by braces 26 and 27. A brace 27 is attached at its upper end to the planter lifting beam C. The brace 26 is connected at its lower end to the bearing 15 and extending forward and engaged with the left hand bearing 28 for the planter axle.

It will be noted that with this construction the vertical shaft 21 for the chopper itself is disposed in line with the center of the vertically movable beam C which as usual is vertically adjustable by means of the hand lever D. While in Figs. 1 and 2 the axis of the chopper is shown as being disposed immediately below the lower end of the beam C, yet under some circumstances, it is desirable to mount the axis of the chopper slightly ahead of the beam C, though in the middle line thereof and to that end, we may use a housing 11 having at one end a rearwardly extending member 28 in turn having attached thereto the vertically extending plate 29 which extends upward within the U-shaped bracket 10 shown in Fig. 2. The housing 11 at one end is slotted so that the housing may be adjustable.

It will be seen that this attachment may be readily applied to the ordinary planter frame or removed therefrom and that when in use it travels along the row or beside the row or between two rows and that the cutters or hoes will bar out and chop the cotton into stands.

It is to be understood, of course, that the lifting beam C which is shown diagrammatically in the drawings is so mounted in or on the tongue B that its lower end may swing forward while the teeth of the lifting beam are in engagement with the toothed wheel d which is operated by the hand lever D. As illustrated, the beam C passes through a slot c in the tongue B and as illustrated in Fig. 1 in dotted lines, this slot c extends sufficiently forward as to permit the forward movement of the lower end of the beam C necessitated by the engagement of the shaft 14 with the sleeve 15 and the brace 26. The mounting of the lifting beam C upon the tongue and its connection with the hand lever D may be of any character ordinarily found upon planters and the drawings merely shows a general form of frame commonly used in planter mechanisms.

We claim:

1. The combination with a wheeled supporting frame having a rotatable axle and having a vertical beam, of a housing mounted upon the lower end of the beam, a transverse shaft mounted in said housing and carrying a beveled gear wheel, a vertical shaft mounted at its upper end in the housing and carrying a coacting gear wheel, a spider mounted upon the lower end of said shaft, cutters mounted upon the spider, each cutter having a shank extending downward from the spider and a cutter extending outward horizontally from the lower end of the downwardly bent portion of the shank, the cutters being disposed in radial relation to each other, and means for operatively connecting the shaft to the axle.

2. The combination with a planter having an axle, traction wheels thereon, a tongue and an upright beam mounted upon the planter, of a housing mounted upon the lower end of the upright beam, a transversely extending shaft mounted in bearings in said housing and carrying a beveled gear wheel, a vertical shaft having its upper end disposed in the housing and carrying a coacting beveled gear wheel, radial cutters mounted upon the shaft and having horizontally extending blades, a sprocket wheel mounted upon the transversely extending shaft, a driving sprocket wheel mounted upon the axle, a sprocket chain connecting said sprocket wheels, and a bearing through which said transverse shaft passes, the bearing having braces extending one to the upper end of the upright beam and the other to an axle bearing.

3. A cotton chopping attachment for planters comprising a bracket adapted to be attached to a vertical beam on the planter, a housing mounted on the bracket, a transverse shaft mounted in the housing, a vertical shaft having its upper end mounted in the housing, a support carried on the lower end of the vertical shaft and having arms, cutters having their shafts detachably engaged with said arms, the cutters having blades disposed in a horizontal plane and offset from the shanks, a sprocket wheel mounted upon the transverse shaft, a sprocket wheel adapted to be mounted upon the axle of the planter, a sprocket chain connecting said wheels, a bearing through which the transverse shaft passes, and braces engaged with said bearing and adapted to be engaged with the upper end of said vertical beam on the standard and with one of the bearings for the axle.

4. The combination with a planter having an axle, traction wheels thereon, a tongue, a vertically extending beam vertically adjustable through the tongue and a lever operatively connected to the beam to vertically adjust it, of a transversely extending supporting member operatively supported upon the lower end of the vertical beam and disposed in a plane beneath the lower end of the vertical beam, a transversely extending shaft mounted in bearings in said supporting member and carrying a beveled gear wheel, a vertical shaft having its upper end disposed within the supporting member and carrying a coacting beveled gear wheel, radial cutters mounted upon the shaft and having horizontally extending blades, a sprocket wheel mounted upon the transversely extending shaft, a driving sprocket wheel mounted upon the axle, a sprocket chain connecting said sprocket wheels, and a bearing through which said transverse shaft passes, having braces extending one to the axle and the other to the vertically adjusting beam.

WILLIAM A. LIERMAN.
ZILMON B. JONES.